(12) United States Patent
Bertino et al.

(10) Patent No.: US 8,135,426 B2
(45) Date of Patent: Mar. 13, 2012

(54) OPTIMISTIC TALK-PERMIT RELIABILITY ENHANCEMENT IN A PUSH-TO-TALK SYSTEM

(75) Inventors: Jeffrey S. Bertino, Poway, CA (US); Eric C. Rosen, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1998 days.

(21) Appl. No.: 10/924,542

(22) Filed: Aug. 24, 2004

(65) Prior Publication Data

US 2006/0046760 A1 Mar. 2, 2006

(51) Int. Cl.
*H04B 7/00* (2006.01)

(52) U.S. Cl. .......................... 455/519; 455/518; 455/520

(58) Field of Classification Search .......... 455/516–521, 455/526, 416, 466; 709/204–207
See application file for complete search history.

(56) References Cited

U.S. PATENT DOCUMENTS

| | | | |
|---|---|---|---|
| 5,642,398 A | 6/1997 | Tiedemann, Jr. et al. | |
| 6,393,285 B1 | 5/2002 | Stephens | |
| 6,400,941 B1 | 6/2002 | Nara | |
| 7,069,032 B1* | 6/2006 | El-Fishawy | 455/517 |
| 7,170,863 B1* | 1/2007 | Denman et al. | 370/260 |
| 7,539,508 B2 | 5/2009 | Bahl et al. | |
| 2002/0024940 A1 | 2/2002 | Smith | 370/329 |
| 2002/0086665 A1* | 7/2002 | Maggenti et al. | 455/416 |
| 2002/0161872 A1 | 10/2002 | Pontoppidan et al. | 709/223 |
| 2003/0037033 A1 | 2/2003 | Nyman et al. | |
| 2003/0072315 A1 | 4/2003 | Karino | 370/401 |
| 2003/0083894 A1 | 5/2003 | Bell et al. | 705/1 |
| 2003/0119540 A1* | 6/2003 | Mathis | 455/518 |
| 2003/0198196 A1 | 10/2003 | Bahl et al. | 370/311 |
| 2003/0231608 A1 | 12/2003 | Wentink | |
| 2004/0032843 A1 | 2/2004 | Schaefer et al. | |
| 2004/0196815 A1 | 10/2004 | Acosta et al. | 370/338 |
| 2004/0203766 A1* | 10/2004 | Jenniges et al. | 455/435.1 |
| 2005/0009537 A1* | 1/2005 | Crocker et al. | 455/456.3 |

(Continued)

FOREIGN PATENT DOCUMENTS

CN 1452004 A 10/2003

(Continued)

OTHER PUBLICATIONS

Translation of Office Action in Japan application 2007-530077 corresponding to U.S. Appl. No. 10/924,542, citing WO03101007, JP2002544728, JP10294967, JP05316019, JP2003199141 and JP2002544733 dated Mar. 1, 2011.

(Continued)

*Primary Examiner* — Fayyaz Alam (74) *Attorney, Agent, or Firm* — Raphael Freiwirth (57) ABSTRACT

A system, method, and computer program for providing a greater reliability for a direct-communication, such as push-to-talk communication, being bridged between members of a communicating group of wireless telecommunication devices. Each wireless telecommunication device, such as a cellular telephone or PDA, of a plurality periodically informs a group communication server of the presence of that wireless telecommunication device on the wireless telecommunication network such that upon receipt of a request from a wireless telecommunication device to bridge a direct communication, the group communication server will attempt to bridge the requested direct communication with the target set of wireless telecommunication devices only if at least one of the wireless telecommunication devices of the target set has indicated its presence on the wireless telecommunication network.

1 Claim, 4 Drawing Sheets

U.S. PATENT DOCUMENTS

| | | | |
|---|---|---|---|
| 2005/0044144 A1* | 2/2005 | Malik et al. | 709/205 |
| 2005/0102364 A1* | 5/2005 | Ozzie et al. | 709/207 |
| 2005/0143111 A1* | 6/2005 | Fitzpatrick et al. | 455/518 |

FOREIGN PATENT DOCUMENTS

| | | |
|---|---|---|
| JP | 10294967 | 11/1988 |
| JP | 05316019 | 11/1993 |
| JP | 2002544728 | 12/2002 |
| JP | 2002544733 | 12/2002 |
| JP | 2003199141 | 7/2003 |
| JP | 2005528036 | 9/2005 |
| KR | 1020010006814 | 1/2001 |
| KR | 1020040003939 | 1/2004 |
| WO | WO0069187 | 11/2000 |
| WO | WO0069203 | 11/2000 |
| WO | WO03/101007 | 12/2003 |
| WO | WO2004019217 A1 | 3/2004 |

OTHER PUBLICATIONS

International Search Report and Written Opinion—PCT/US2005/030078—ISAEPO—Mar. 10, 2006.
Supplementary European Search Report—EP05790154—Search Authority—The Hague - Feb. 21, 2011.

* cited by examiner

OPTIMISTIC TALK-PERMIT RELIABILITY ENHANCEMENT IN A PUSH-TO-TALK SYSTEM

BACKGROUND OF THE INVENTION

1. Field of the Invention

The present invention relates to point-to-point or point-to-multipoint communications systems. More specifically, the present invention relates to systems and methods for providing a greater reliability for permitting direct-communication, such as a push-to-talk communication, between members of a communicating group of wireless telecommunication devices.

2. Description of the Related Art

In wireless telecommunication devices, such as cellular phones, PDAs, mini-laptops, and advanced pagers, the devices typically communicate over long distances by bridging telephone calls through existing cellular telephone networks and passing data packets across the network. These wireless devices often have limited to significant data processing and computing capability, and can accordingly send and receive software programs, in addition to voice, across the telephone network.

There exists a wireless telecommunication service that provides a quick one-to-one or one-to-many communication that is generically referred to as "Push-To-Talk" (PTT) capability. The specific PTT group of recipient devices for the communicating wireless device is commonly set up by the carrier and the wireless devices themselves do not allow the modification of the group, i.e. to include or drop individuals from the group, or to purposely direct a communication to be received by any fewer members than the entire group.

A PTT communication connection is typically initiated by a single button-push on the wireless device that activates a half-duplex link between the speaker and each member device of the group and once the button is released, the device can receive incoming PTT transmissions once the button is released. In some arrangements, the PTT speaker will have the "floor" where no other group member can speak while the speaker is speaking. Once the speaker releases the PTT button, any other individual member of the group can engage their PTT button and they will have the floor.

In existing PTT systems, a person desiring to talk, i.e. have the floor, will press the PTT button and the wireless device will only indicate the availability of the PTT channel with an affirmative or negative audible signal. If an affirmative signal is indicated, then the person starts to talk over the PTT channel, but there is no way for the person to know if his or her communication was received by any member of the group. There accordingly is a need for a system to increase the reliability of the PTT communication being received by member devices of the designated PTT group.

Accordingly, it would be advantageous to provide a system and method for a wireless device member of a group to have a reliable PTT communication channel that at least is very likely to reach at least one member of the target group. The system and method should indicate to the person desiring to engage in a PTT communication if no group members are available on the wireless network to receive the PTT communication, or otherwise not permit talking on the PPT channel unless the required number of receiving devices is present on the wireless network. Further, such system and method should allow the member wireless devices of the PTT group to easily inform the system of their presence on the wireless network. It is thus to the provision of such a system and method to optimize the talk-permit reliability among wireless devices in a PTT group that the present invention is primarily directed.

SUMMARY OF THE INVENTION

The present invention includes a system, method, and computer program for providing a greater reliability for a direct-communication, such as PTT communication, being bridged between members of a communicating group of wireless telecommunication devices. Each wireless telecommunication device, such as a cellular telephone or PDA, of a designated PTT group periodically informs a group communication server of the presence of that wireless telecommunication device on the wireless telecommunication network such that upon receipt of a request from a wireless telecommunication device to talk, the group communication server will attempt to bridge the requested communication channel with the target set of wireless telecommunication devices only if at least one of the wireless telecommunication devices of the target set has indicated its presence on the wireless telecommunication network.

The system for increasing successful direct communications between a group of wireless telecommunication devices on a wireless communication network includes the plurality of wireless telecommunication devices that are each capable of selectively directly communicating across the wireless communication network with the target set of one or more other wireless telecommunication devices within the plurality. The group communication server selectively receives the requests to bridge direct communications between the communicating wireless telecommunication device and the one or more other wireless telecommunication devices of the target set for the communicating wireless telecommunication device and then selectively bridges the requested direct communication, and the identity of the target set of one or more other wireless telecommunication devices is selectively available to the group communication server, either resident thereat or otherwise accessible. Each of the plurality of wireless telecommunication devices periodically informs the group communication server of the presence of that wireless telecommunication device on the wireless telecommunication network such that upon receiving a request from a wireless telecommunication device to bridge a direct communication, the group communication server will attempt to bridge the requested direct communication with the target set of wireless telecommunication devices only if at least one of the wireless telecommunication devices of the target set has informed the group communication server of the presence of that wireless telecommunication device on the wireless network. The group communication server can alternately inform the communicating wireless device if there is no member device present on the wireless network and a direct communication will not be attempted.

The method for increasing successful direct communications between a group of wireless telecommunication devices on a wireless communication network include the steps of establishing a connection to the wireless network from the wireless telecommunication device that is capable of selectively directly communicating across the wireless communication network with the target set of one or more other wireless telecommunication devices, and then periodically informing the group communication server from the wireless telecommunication device of the presence of that wireless telecommunication device on the wireless telecommunication network, where the group communication server selectively receives requests to bridge direct communications between the communicating wireless telecommunication device and the one or more other wireless telecommunication devices in the target set for that communicating wireless telecommunication device.

The method then includes the steps of receiving a request at the group communication server from the wireless telecommunication device to bridge a direct communication to the target set of other wireless telecommunication devices on the wireless network, determining the identity of the target set of one or more other wireless telecommunication devices at the group communication server, and if at least one of the wireless telecommunication devices of the target set has informed the group communication server of the presence of that wireless telecommunication device on the wireless network, then bridging the requested direct communication between the communicating wireless telecommunication device and the target set of one or more other wireless telecommunication devices. Alternately, a greater number of predetermined wireless devices having indicated their presence on the network can be required in order for the group communication server to allow the direct communication to be attempted.

Accordingly, the present system and method are advantageous in that a wireless device member of a group will have a reliable PTT communication channel that is very likely to reach at least one member of the target group because the member devices of the group periodically inform the group communication server of their presence on the wireless network, thus indicating their ability to receive a communication. The system and method can indicate to the person desiring to engage in a PTT communication if no group members are available on the wireless network to receive the PTT communication, and will not use the valuable communication channel if a direct communication cannot be bridged. Further, the system and method can be easily implemented on the member wireless devices of the PTT group to inform the system of their presence on the wireless network either through short direct communication or through piggybacking a signal on existing communication channels already established, such as an ongoing voice or data call.

Other objects, features, and advantages of the present invention will become apparent after review of the Brief Description of the Drawings, Detailed Description of the Invention, and Claims.

DETAILED DESCRIPTION OF THE INVENTION

Figure 1:
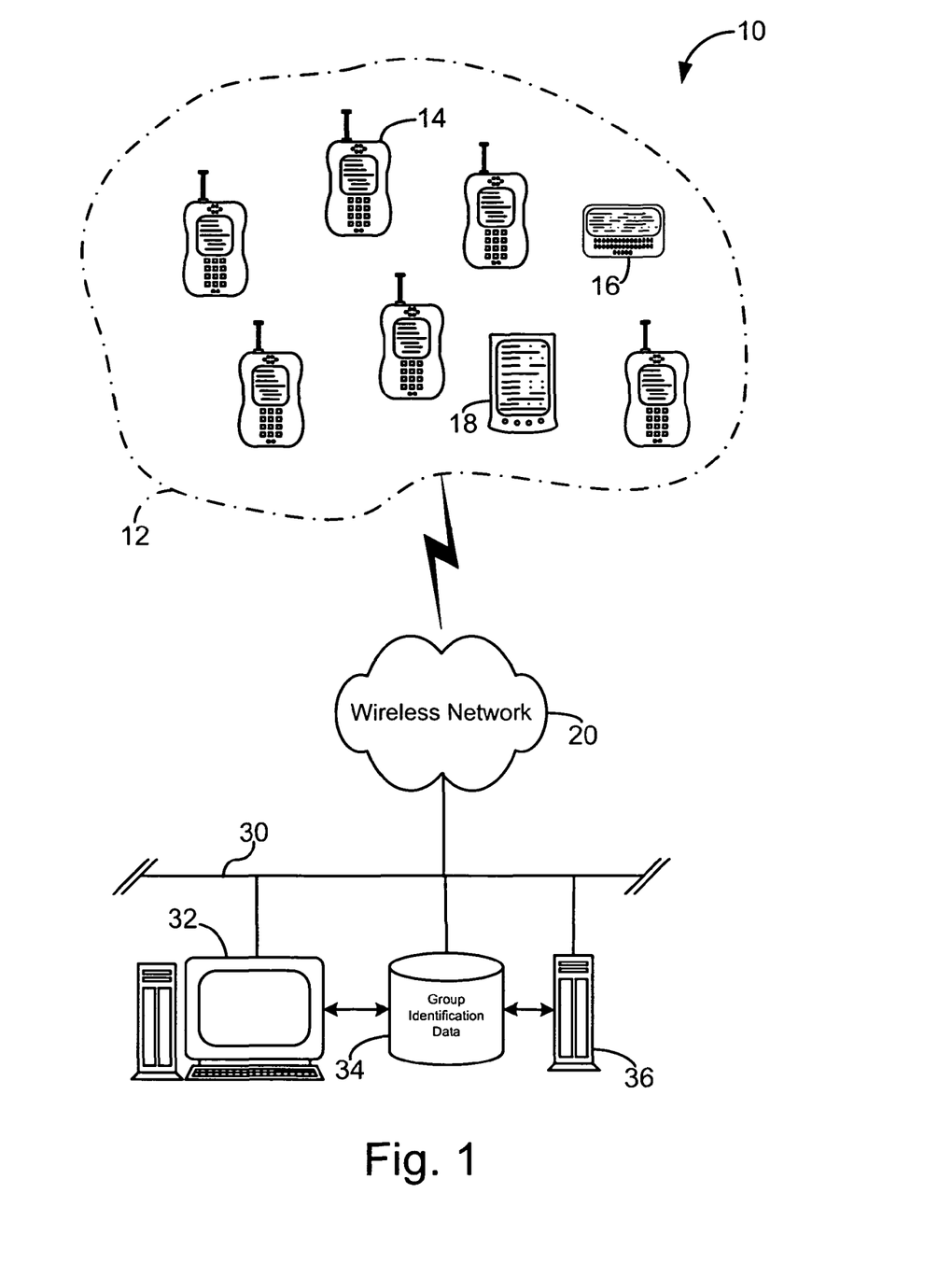
FIG. 1 is a representative diagram of a wireless network with a designated PTT group of wireless telecommunication devices communicating with a group communication server and other computer devices across the wireless network.

With reference to the figures in which like numerals represent like elements throughout, FIG. 1 illustrates the system 10 for optimizing the talk-permit reliability for one or more wireless telecommunication devices in a PTT group, such as the wireless telephone 14, smart pager 16 and personal digital assistant (PDA) 18, with other wireless telecommunication devices across a wireless network 20. In the system 10, each wireless telecommunication device 14,16,18 is capable of selectively directly communicating across the wireless communication network 20 with a target set 12 of one or more other wireless telecommunication devices with the plurality. For example, the target set for cellular telephone 14 can all devices in the target set 12 or a subset thereof, such as pager 16 and PDA 18.

A group communication server 32 selectively receives requests to bridge direct communications between the communicating wireless telecommunication device 14,16,18 and the one or more other wireless telecommunication device in the target set 12 for the communicating wireless telecommunication device, and then selectively bridges the requested direct communication, such as PTT communication. The identity of the target set 12 is selectively available to the group communication server 32, such as being resident on the group communication server 32 or in a connected database 34, or possibly on another computer device, such as server 36.

As used herein, the term "bridging" the direct communication is intended to be separate from "registration" with the group communication server 32 as exists in current PTT systems. In the existing systems, each PTT wireless device "refreshes" a registration with the group communication server 32 on a periodic schedule for overall communication purposes, such as locating the wireless device for an incoming voice call. In the present system, each wireless telecommunication device 14,16,18 registers with the group communication server 32 independently of communication registration, such as making the wireless device available to receive voice calls. Thus, when a direct communication, such as a PTT call, is attempted, the bridge is established based on the presence information in the group communication server 32, as opposed to registration status.

Preferably, each of the plurality of wireless telecommunication devices 14,16,18 in the target set 12 periodically inform the group communication server 32 of their presence of the wireless telecommunication device on the wireless network 20, and upon receiving a request from a wireless telecommunication device 14,16,18 to bridge a direct communication, the group communication server 32 will only attempt to bridge the requested direct communication, such as permitting the communication device to talk, if at least one of the wireless telecommunication devices of the target set 12 has informed the group communication server 32 of the presence of that wireless telecommunication device 14,16,18 on the wireless network 20. All of the wireless telecommunication devices of the target set 12 do not need to periodically inform the group communications server 32 of their presence on the wireless network 20, but the greater the number of participating wireless telecommunication devices, the greater the optimization of the communication, or talk-permit, reliability.

Furthermore, even if only one wireless device of the target set 12 is present on the wireless network 20, the group communication server 32 preferably still attempts to bridge the direct communication to all wireless devices of the target set 12 even though some of them may not have indicated their presence. Also, if at least one of the wireless telecommunication devices 14,16,18 of the target set 12 has not informed the group communication server 32 of the presence of that wireless telecommunication device on the wireless network 20, the group communication server 32 can poll the target set 12 of wireless telecommunication devices 14,16,18 to determine if at least one of the wireless telecommunication devices are present on the wireless network 20, prior to sending an error to the communicating wireless device indicating the failure to bridge the connection.

In this embodiment, the wireless telecommunication device (such as cellular telephone 14) sends a flag to at least the group communication server 32, which is present on a server-side LAN 30 across the wireless network, to indicate that the wireless device is present, i.e. accessible, on the wireless network 20. The group communication server 32 can share this information with the set 12 of target wireless telecommunication devices designated by the first wireless telecommunication device, or can also share is with other computer devices resident on the server-side LAN 30 or accessible across the wireless network 20. The group communication server 32 can have an attached or accessible database 34 to store the group identification data for the wireless devices that another server 36 controls group communications for. It should be appreciated that the number of computer components resident on server-side LAN 30, or across the wireless network 20, or Internet generally, are not limited.

The direct communication, such as a PTT communication, can be established through a half-duplex channel between the communicating wireless telecommunication device 14,16,18 and the one or more other wireless telecommunication devices of the target set 12. It should be noted that the group communication server 32 does not have to contact any specific wireless device 14,16,18 of the target set 12 before half of the "bridge" between the communicating wireless telecommunication device and group communication server 32 is established. That is, the communicating wireless device will send the incoming communication to the group communication server 32 and the initial half-duplex channel can be opened to the group communication server 32, which will then determine if members of the target set 12 of wireless telecommunication devices are available for receiving the direct communication prior to opening communication channels to the members of the target set 12.

Also, the group communication server 32 can attempt to bridge the requested direct communication with the target set 12 if at least a predetermined number of the wireless telecommunication devices of the target set have informed the group communication server 32 of their presence on the wireless network 20. Such preference can be indicated in the communicating wireless device either in a general set up of the target set 12 group communications, or at the time the group communication request is made, i.e. 3 PTT button pushes indicates that the group communication server 32 is to bridge the direct communication only if three members of the target set 12 have indicated their presence on the wireless network 20.

In one embodiment, the wireless telecommunication device 14,16,18 informs the group communication server 32 of the presence of the wireless telecommunication device on the wireless network 20 with a short data burst message in order to minimize bandwidth and communication time over the expensive telecommunication bandwidth. In another embodiment, the wireless telecommunication device 14,16, 18 can inform the group communication server 32 of the presence of the wireless telecommunication device on the wireless network 20 with a message piggybacked on an existing wire communication channel of the wireless telecommunication device on the wireless communication network. Thus, if the wireless device 14,16,18 has an open voice or data call, the wireless device can place a flag or other message in the data stream that will ultimately be routed to the group communication server 32 to inform it of the wireless network 20 presence of the wireless device 14,16,18. In such embodiment, the period for informing the group communications server 32 can then be waiting for an open communication channel if desired.

The group communication sever 32 can also inform the wireless telecommunication device 14,16,18 of the inability to bridge a direct communication to the target set 12 upon a predetermined number of the wireless telecommunication devices (or at least one) of the target set 12 not having informed the group communication server 32 of their presence on the wireless network 20. An example of such embodiment is the 3 times depression of the PTT button at the communicating wireless device 14 to request group communication if at least 3 persons are on the wireless network 20, and the group communication server 32 responding with a data message, such as one that causes an audible error at the communicating wireless device, to indicate that the requested direct communication cannot be bridged. Further, while the group communication server 32 is shown here as having the attached database 34 of group identification data, the group communication server 32 can have group identity data resident thereupon.

Figure 2:
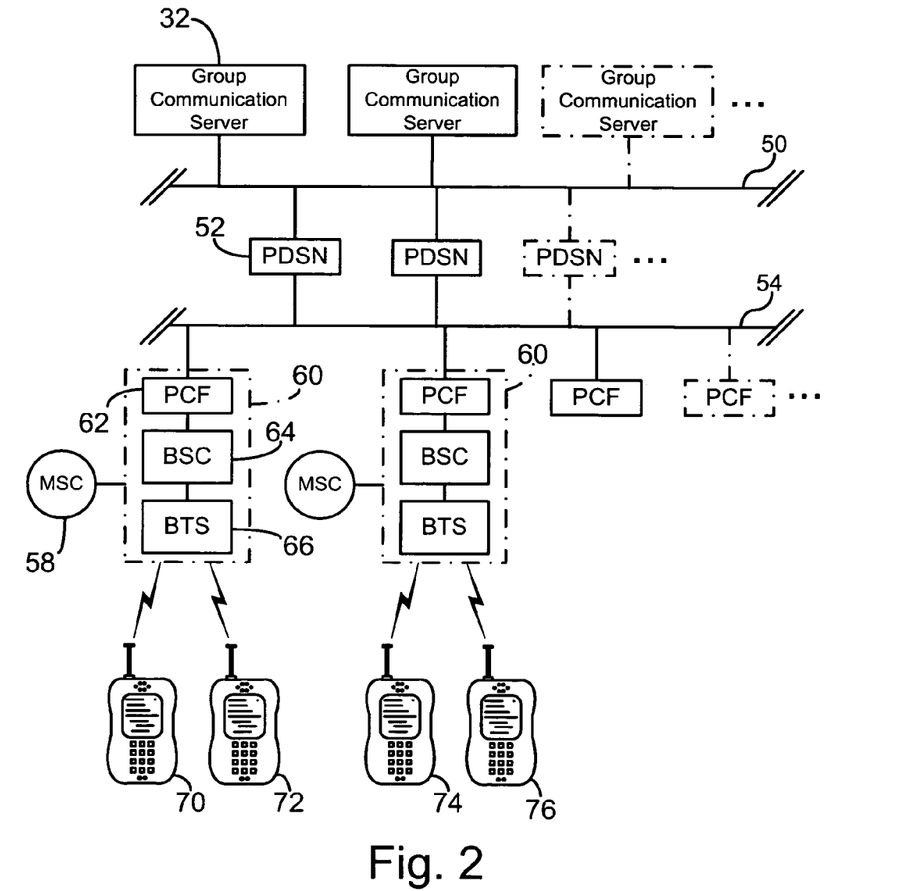
FIG. 2 is a representative diagram of one embodiment of a wireless network in a common cellular telecommunication configuration, having a group communication server control communications between the wireless telecommunication devices of PTT group members.

FIG. 2 is a representative diagram of one embodiment of a wireless network in a common cellular telecommunication configuration, having a group communication server 32 control communications between the wireless devices of set group members (devices 70,72,74,76) in a PTT system. The wireless network is merely exemplary and can include any system whereby remote modules communicate over-the-air between and among each other and/or between and among components of a wireless network 20, including, without limitation, wireless network carriers and/or servers. A series of group communication servers 32 are connected to a group communication server LAN 50. Wireless telephones can request packet data sessions from the group communication server(s) 32 using a data service option.

The group communication server(s) 32 are connected to a wireless service providers packet data service node (PDSN) such as PSDN 52, shown here resident on a carrier network 54. Each PSDN 52 can interface with a base station controller 64 of a base station 60 through a packet control function (PCF) 62. The PCF 62 is typically located in the base station 60. The carrier network 54 controls messages (generally in the form of data packets) sent to a messaging service controller ("MSC") 58. The carrier network 30 communicates with the MSC 32 by a network, the Internet and/or POTS ("plain ordinary telephone system"). Typically, the network or Internet connection between the carrier network 54 and the MSC 58 transfers data, and the POTS transfers voice information. The MSC 58 can be connected to one or more base stations 60. In a similar manner to the carrier network, the MSC 58 is typically connected to the branch-to-source (BTS) 66 by both the network and/or Internet for data transfer and POTS for voice information. The BTS 66 ultimately broadcasts and receives messages wirelessly to and from the wireless devices, such as cellular telephones 70,72,74,76, by short messaging service ("SMS"), or other over-the-air methods known in the Cellular telephones and telecommunication devices, such as wireless telephone 14, are being manufactured with increased computing capabilities and are becoming tantamount to personal computers and hand-held PDAs. These "smart" cellular telephones allow software developers to create software applications that are downloadable and executable on the processor of the wireless device. The wireless device, such as cellular telephone 14, can download many types of applications, such as web pages, applets, MIDlets, games and stock monitors, or simply data such as news and sports-related data. In wireless devices that have designated a set 12 of group members, the wireless device can directly connect with the other member of the set and engage in voice and data communication. However, all such direct communications will occur through, or at the control of, the group communication server 32. All data packets of the devices do not necessarily have to travel through the group communication server 32 itself, but the server 32 must be able to ultimately control the communication because it will typically be the only server-side 30 component that is aware of and/or can retrieve the identity of the members of the set 12, or direct the identity of the members of the set 12 to another computer device.

Figure 3:
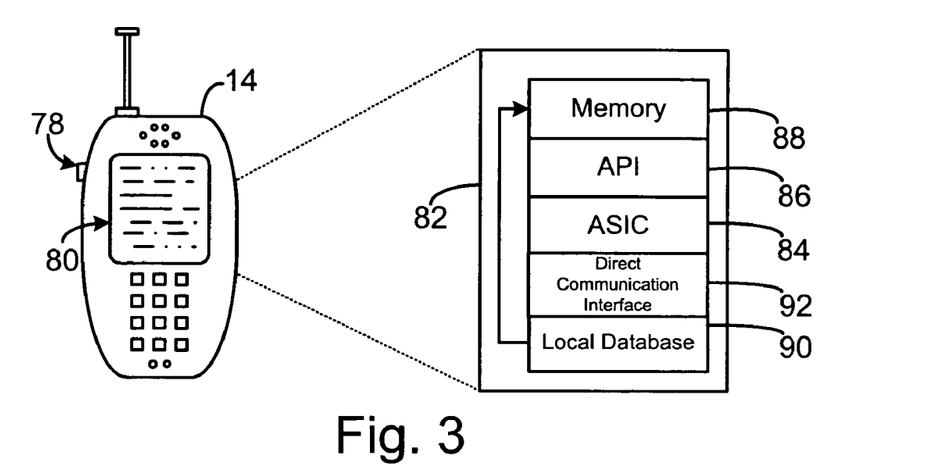
FIG. 3 is a block diagram illustrating the computer platform of the wireless telecommunication device with PTT capability where a computer program can be executed to periodically inform the group communication of the wireless device's presence on the wireless network.

FIG. 3 is a block diagram illustrating one embodiment of the wireless telecommunication device being a cellular telephone 14 with a PTT button 78 that opens the direct communication to the target set 12 of devices. The wireless device 14 is also shown as having a graphics display 80 to the user of the wireless device 14. The wireless device 14 includes a computer platform 82 that can handle voice and data packets, and receive and execute software applications transmitted across the wireless network 20. The computer platform 80 includes, among other components, an application-specific integrated circuit ("ASIC") 84, or other processor, microprocessor, logic circuit, programmable gate array, or other data processing device. The ASIC 84 is installed at the time of manufacture of the wireless device and is not normally upgradeable. The ASIC 84 or other processor executes an application programming interface ("API") layer 86, which includes the resident application environment, and can include the operating system loaded on the ASIC 84. The resident application environment interfaces with any resident programs in the memory 88 of the wireless device. An example of a resident application environment is the "binary runtime environment for wireless" (BREW) software developed by Qualcomm® for wireless device platforms.

As shown here, the wireless device can be a cellular telephone 14, with a graphics display, but can also be any wireless device with a computer platform as known in the art, such as a personal digital assistant (PDA), a pager with a graphics display, or even a separate computer platform that has a wireless communication portal, and may otherwise have a wired connection to a network or the Internet. Further, the memory 88 can be comprised of read-only or random-access memory (RAM and ROM), EPROM, EEPROM, flash cards, or any memory common to computer platforms. The computer platform 82 can also include a local database 90 for storage of software applications not actively used in memory 88. The local database 90 is typically comprised of one or more flash memory cells, but can be any secondary or tertiary storage device as known in the art, such as magnetic media, EPROM, EEPROM, optical media, tape, or soft or hard disk.

In this embodiment of the wireless device 14, the computer platform 82 also includes a direct communication interface 92 that can open the direct communication channel from the wireless device. The direct communication interface 92 can also be part of the standard communication interface for the wireless device which ordinarily carries the voice and data transmitted to and from the wireless device. The direct communication interface 92 typically is comprised of hardware as is known in the art.

Figure 4:
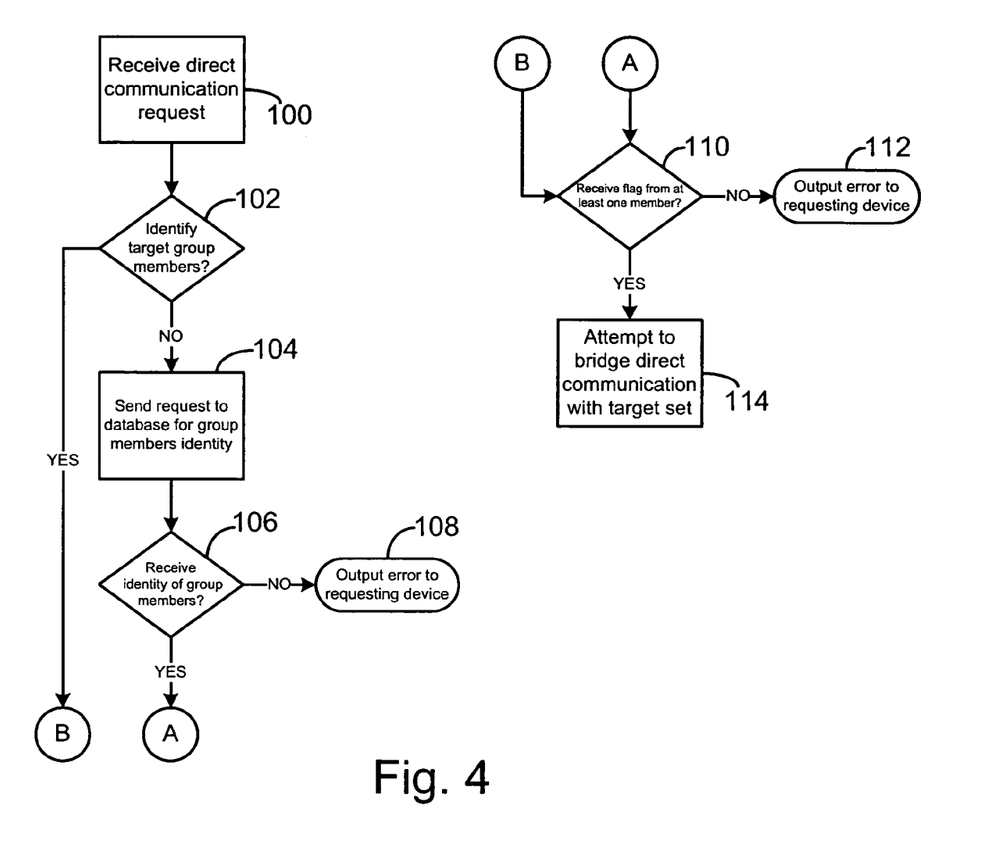
FIG. 4 is a flowchart of one embodiment of the process executing on the group communication server to optimize talk-permit reliability for direct group communications.

FIG. 4 is a flowchart of one embodiment of the process executing on the group communication server 32 to optimize talk-permit reliability for direct group communications. A direct communication request is received at the group communication server 32, as shown at step 100, and an example is a button 78 press on wireless telephone 14 being made requesting a direct communication. Then a determination is made as to whether the group members, and specifically the wireless telecommunication devices, of the target set 12 can be identified, as shown by decision 102. If the target set 12 members can be identified at decision 102, then the process forwards to decision 110. Otherwise, if the target set 12 members cannot be identified at decision 102, then a request is sent from the group communication server 32 to the group identification database 34 to learn of the identity of the group member devices of the target set 12.

A determination is then made as to whether the identity of the group member devices of the target set 12 has been received by the group communication server 32, as shown at decision 106. If the group member identity has not been received at decision 106, then an error 108 is output to the communicating wireless device requesting the direct communication. The error can indicate to the user of the communication device that the group members of the target set 12 could not be identified. If the group member identity of the target set 12 have been received at decision 106, or if the group member identity was identified at decision 102, the process then makes a determination as to whether at least one flag (or data message or other indication of network presence) has been received for at least one member device (or the predetermined number of group member devices required to be present) as shown at decision 110.

If at least one flag (or the predetermined number of flags) has not been received by the group communication server 32 at decision 110, then an error 112 is output to the communication wireless device indicating that the require number of member devices of the target set 12 were not present on the wireless network 20 to bridge the requested direct communication. Otherwise, if there is at least one member device (or the predetermined number of member devices) present on the wireless network 20, then the requested direct communication is attempted bridged by the group communication server 32, as shown at step 114, which can use the existing wireless network infrastructure for PTT communications or other direct communication. In an alternate embodiment, instead of error 112, the group communication server 32 polls the member wireless telecommunication devices 14,16,18 of the target set 12 to determine if they are in fact on the wireless network 20. And if so, the process continues to step 114. If not, then an error is output in the same manner as error 112.

Figure 5:
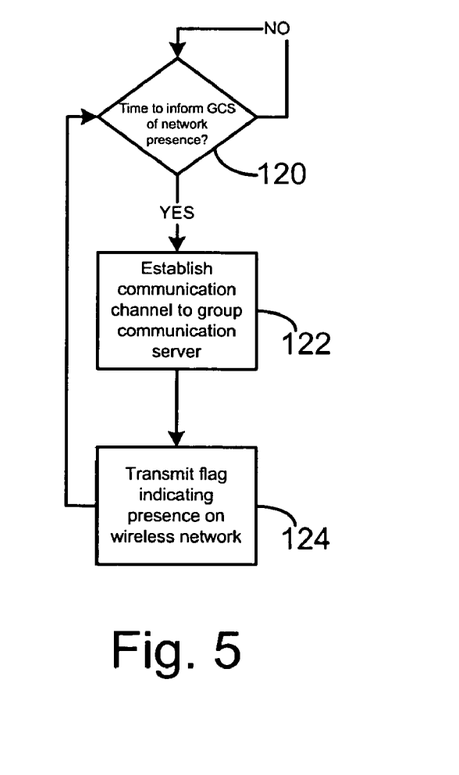
FIG. 5 is a flowchart of one embodiment of the process executing on the wireless telecommunication device to periodically inform the group communication server of the presence of the wireless device on the wireless network.

FIG. 5 is a flowchart of one embodiment of the process executing on the computer platform 82 of the wireless telecommunication device 14,16,18 to periodically inform the group communication server 32 of the presence of the wireless device on the wireless network 20. A determination is made as to whether it is time to inform the group communication server 32 of the presence of the wireless device on the wireless network 20, as shown by decision 120. If the is not time at decision 120, then the process enters a wait state at decision 120 and will not proceed until the inform time has been reached. Once it is time to inform the group communication server 32 at decision 120, then a communication channel is established from the wireless telecommunication device 14,16,18 to the group communication server 32, as shown at step 122, and then a flag is transmitted to the group communication server 32 indicating the presence of the wireless telecommunication device 14,16,18 on the wireless network 20. Then process then returns to decision 120 to enter a wait-state until the next inform period elapses. If so embodiment, the establishing of the communication channel at step 122 can occur as a voice or data call over the wireless network 20, or can be a piggybacked channel on an existing communication channel.

From FIGS. 4 and 5, it can thus be seen that the wireless device 14 and group communication server 32 therefore provide a method for increasing successful direct communications between a group of wireless telecommunication devices 14,16,18 on a wireless communication network 20 including the steps of establishing a connection to a wireless network 20 from a wireless telecommunication device 14,16,18 being capable of selectively directly communicating across the wireless network 20 with a target set 12 of one or more other wireless telecommunication devices, then periodically informing the group communication server 32 of the presence of the wireless telecommunication device 14,16,18 on the wireless telecommunication network 20, where the group communication server 32 selectively receives requests to bridge direct communications between the communicating wireless telecommunication device 14,16,18 and the one or more other wireless telecommunication device in the target set 12 for that communicating wireless telecommunication device. Then the method includes the steps of receiving a request at the group communication server 32 from a wireless telecommunication device 14,16,18 to bridge a direct communication to a target set 12 of other wireless telecommunication devices on the wireless network 20 (step 100), and determining the identity of the target set 12 of one or more other wireless telecommunication devices at the group communication server 32 (decision 102 and step 100), and if at least one of the wireless telecommunication devices 14,16,18 of the target set 12 has informed the group communication server 32 of the presence of that wireless telecommunication device on the wireless network 20 (decision 110), bridging the requested direct communication between the communicating wireless telecommunication device 14,16,18 and the target set 12 of one or more other wireless telecommunication devices (step 144).

The step of informing the group communication server 32 of the presence of the wireless telecommunication device 14,16,18 on the wireless telecommunication network 20 can occur through sending a short data burst message from the wireless telecommunication device 14,16,18 to the group communication server 32. Alternately, the step of informing the group communication server 32 of the presence of the wireless telecommunication device 14,16,18 on the wireless telecommunication network 20 can occur through a message piggybacked on an open communication channel of the wireless telecommunication device 14,16,18 on the wireless communication network 20, such as a voice or data call.

The method can further include the step of storing the identity of the target set 12 of the plurality of wireless telecommunication devices 14,16,18 at the group communication server 32. In such embodiment, the group communication server 32 will not need to request group identity data, i.e. not perform step 104. The step of bridging the requested direct communication can establishing a half-duplex channel between the communicating wireless telecommunication device 14,16,18 and the one or more other wireless telecommunication devices of the target set 12, as is common in the art. Further, the step of the bridging the requested direct communication with the target set of wireless telecommunication devices can occurs only if at least a predetermined number of the wireless telecommunication devices 14,16,18 of the target set 12 have informed the group communication server 32 of their presence on the wireless network 20, as is also further described above. The method can also include the step of the group communication sever 32 informing the wireless telecommunication device 14,16,18 of the inability to bridge a direct communication to the target set 12 upon a predetermined number of the wireless telecommunication devices 14,16,18 of the target set 12 not having informed the group communication server 32 of their presence on the wireless network 20. Additionally, the method can further including the step of, if at least one of the wireless telecommunication devices 14,16,18 of the target set 12 has not informed the group communication server 32 of the presence of that wireless telecommunication device on the wireless network 20, polling the wireless telecommunication devices to determine their presence on the wireless network prior to either bridging the requested direct communication or informing the communication wireless telecommunication device 14,16,18 of the inability to bridge the requested direct communication.

The method accordingly can be implemented by the execution of a program held computer readable medium, such as the memory 88 of the computer platform 82. The instructions can reside in various types of signal-bearing or data storage primary, secondary, or tertiary media. The media may comprise, for example, RAM (not shown) accessible by, or residing within, the wireless device. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the foregoing disclosure shows illustrative embodiments of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated.

What is claimed is:

1. A method for increasing successful direct communications between a group of wireless telecommunication devices on a wireless communication network, comprising:
   a step for establishing a connection to a wireless network from a wireless telecommunication device being capable of selectively directly communicating across the wireless communication network with a target set of one or more other wireless telecommunication devices;
   a step for periodically informing a group communication server from the wireless telecommunication device of the presence of that wireless telecommunication device on the wireless telecommunication network, the group communication server selectively receiving requests to bridge direct communications between a communicating wireless telecommunication device and the one or more other wireless telecommunication device in a target set for that communicating wireless telecommunication device;
   a step for receiving a request at the group communication server from a wireless telecommunication device to bridge a direct communication to a target set of other wireless telecommunication devices on the wireless network;

a step for determining the identity of the target set of one or more other wireless telecommunication devices at the group communication server; and a step for, if at least one of the wireless telecommunication devices of the target set has informed the group communication server of the presence of that wireless telecommunication device on the wireless network, bridging the requested direct communication between the communicating wireless telecommunication device and the target set of one or more other wireless telecommunication devices; further comprising a step for, if at least one of the wireless telecommunication devices of the target set has not informed the group communication server of the presence of that wireless telecommunication device on the wireless network, polling the wireless telecommunication devices to determine their presence on the wireless network prior to bridging the requested direct communication.

* * * * *